United States Patent [19]

Parker et al.

[11] Patent Number: 5,108,128

[45] Date of Patent: Apr. 28, 1992

[54] SELF-PIERCING COVER ASSEMBLY FOR AIRBAG

[75] Inventors: Kent L. Parker, Strafford, N.H.; Laurent R. Guadreau, S. Berwick, Me.

[73] Assignee: Davidson Textron, Inc., Dover, N.H.

[21] Appl. No.: 577,150

[22] Filed: Sep. 4, 1990

[51] Int. Cl.⁵ .............................. B60R 21/22
[52] U.S. Cl. ......................... 280/732; 180/90
[58] Field of Search .......... 280/732, 731, 730, 728, 280/743; 180/90

[56] References Cited

U.S. PATENT DOCUMENTS

| | | | |
|---|---|---|---|
| 3,632,136 | 1/1972 | Foltz | 280/732 |
| 3,756,617 | 9/1973 | Brown | 280/732 |
| 4,097,064 | 6/1978 | Ikawa | 280/732 |
| 4,246,213 | 1/1981 | Takamatsu | 280/728 |
| 4,893,833 | 1/1990 | DiSalvo et al. | 280/732 |
| 4,911,471 | 3/1990 | Hirabayashi | 280/732 |
| 4,989,896 | 2/1991 | DiSalvo et al. | 280/732 |

Primary Examiner—Charles A. Marmor
Assistant Examiner—Karin Tyson
Attorney, Agent, or Firm—John C. Evans

[57] ABSTRACT

A cover assembly for an airbag restraint system has a smooth, grained, plastic cover and a load bearing insert for covering a housing for an airbag and a gas generator which includes an inflatant for the airbag for deploying the airbag through the smooth, grained plastic outer cover member without rupturing the cover member at weakened sections therein and wherein a carriage is formed in an insert opening having a cutter thereon between the cover and the air bag; the cutter has cutting edges thereon directly contacting the cover assembly for perforating the cover during inflation of the airbag so as to form a self-piercing cover assembly which will be cut to form an opening through the cover assembly through which the airbag is deployed; the self-piercing occurring as the airbag is inflated and solely in response to such inflation prior to deployment of the airbag into the passenger compartment.

7 Claims, 2 Drawing Sheets

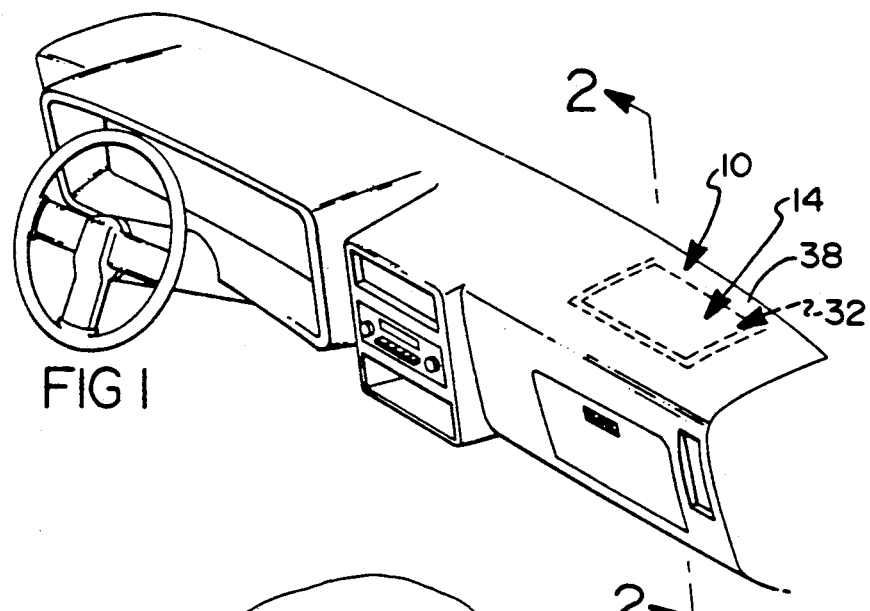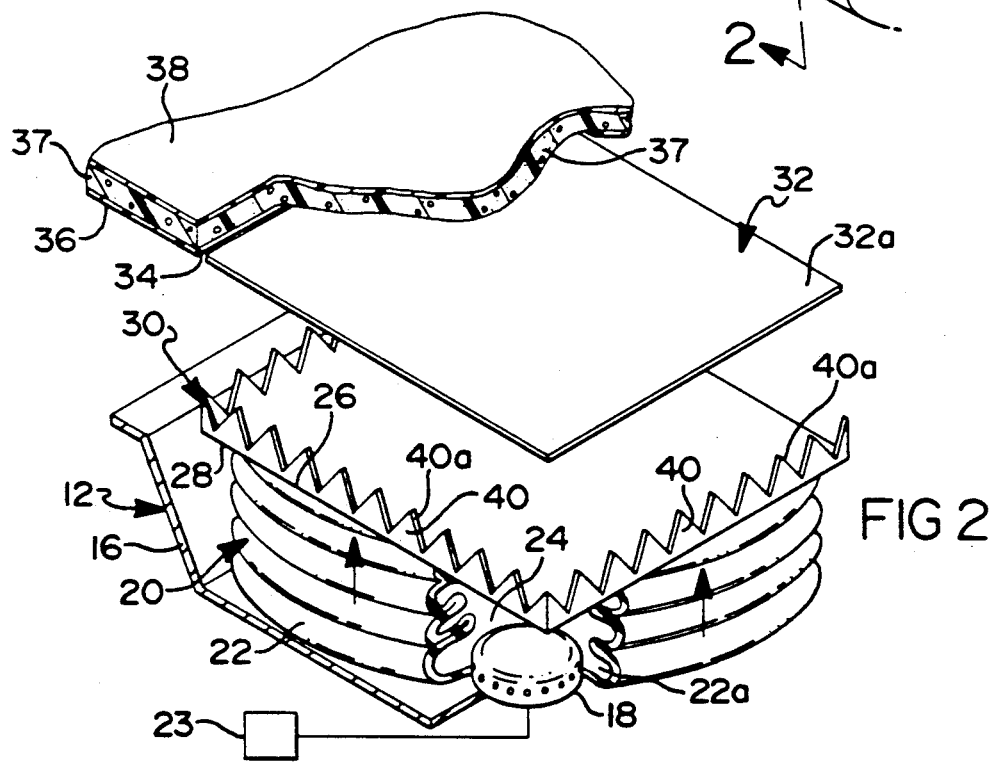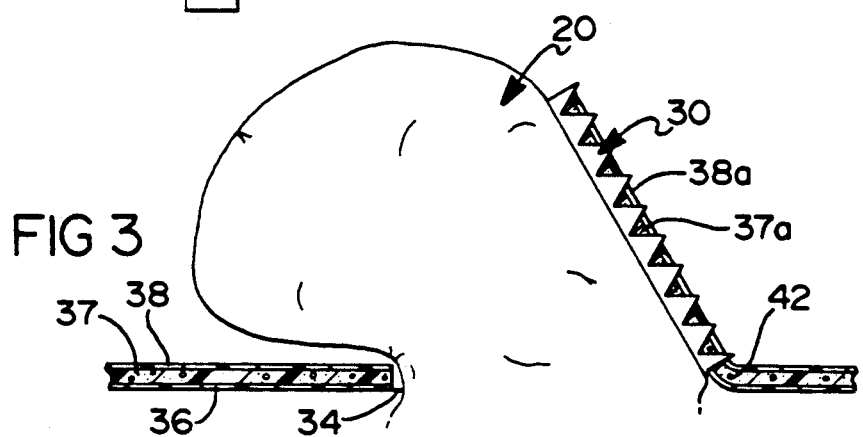

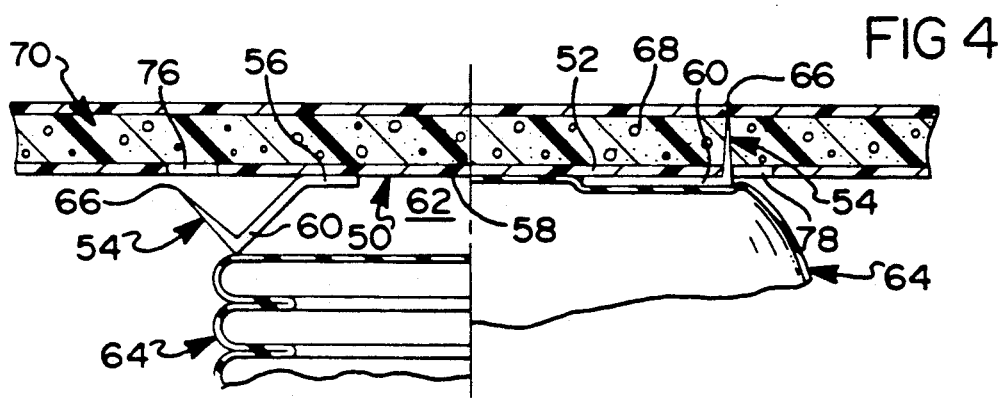
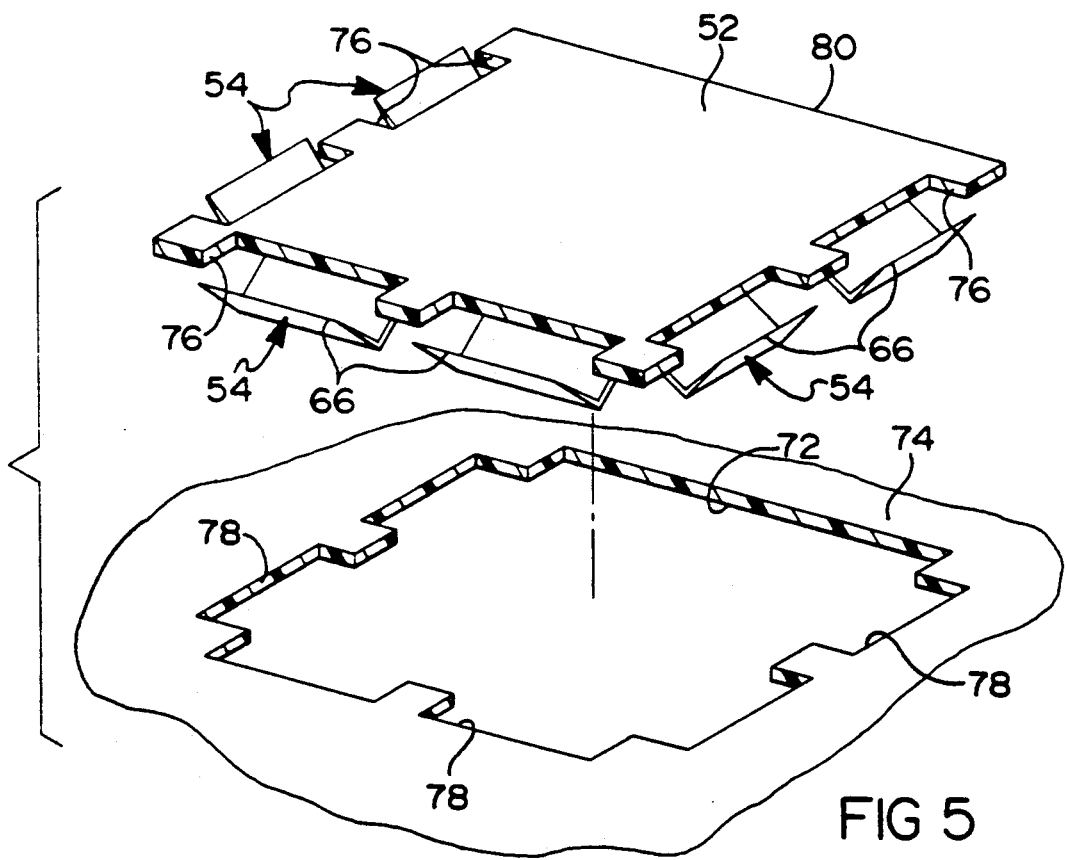

SELF-PIERCING COVER ASSEMBLY FOR AIRBAG

FIELD OF THE INVENTION

This invention relates to airbag restraint systems for vehicles and more particularly to such airbag restraint systems which are covered by a cover assembly for concealing the airbag restraint system in a vehicle passenger compartment as part of the instrument panel.

BACKGROUND OF THE INVENTION

Various airbag restraint systems are known in which a cover assembly covers the airbag restraint components prior to deployment of an airbag into the vehicle passenger compartment.

U.S. Pat. No. 3,622,176 discloses a cover with a perforated outer skin. The problem with such an arrangement is that the weakened sections are visible and thus do not fully conceal the underlying airbag restraint system. Furthermore, such systems depend upon the force of the inflating airbag to tear the cover to form a deployment opening therein. Such tearing can at times hinder deployment in an undesirable manner.

U.S. Pat. No. 4,097,064 discloses a cover assembly which carries a cutter to pierce the outer skin of the cover assembly. However, the '064 arrangement requires separate inertially responsive shields for protecting the airbag during its deployment.

U.S. Pat. No. 4,246,213 discloses a cover assembly that includes a cover having weakened sections in the outer shell or skin of a cover assembly. The '213 arrangement depends upon tearing of the outer skin at the weakened sections for airbag deployment and presents the same disadvantages as in the case of the '176 patent.

SUMMARY OF THE INVENTION

A feature of the present invention is to provide a self-piercing cover assembly for an airbag restraint system in which a cutter is formed as part of the cover and is operative solely in response to airbag inflation for piercing the cover assembly to form an opening therethrough for deployment of an airbag into a vehicle passenger compartment.

A further feature of the present invention is to provide a self-piercing cover assembly for an airbag restraint system which will form an opening through the cover assembly solely in response inflation of the airbag and impact of the airbag against the inboard surface of the cover assembly.

Yet another feature of the present invention is to provide self-piercing cover assemblies as set-forth in the preceding features further characterized by a cutter located on an insert disposed in a retainer member of the cover assembly.

Still another feature of the present invention is to provide an interior trim product for a vehicle having a cover assembly for concealing an airbag restraint system within the interior trim product and wherein the cover assembly includes a polymeric outer skin; a foam layer and an retainer member for supporting the interior trim product on the frame of a vehicle; the retainer member being with an opening having an insert supported therein carrying a cutter blade and having an impact surface on its inboard side and operative solely in response to inflation of the airbag to displace the insert outwardly of the opening to cause the cutter blade to pierce the foam and polymeric outer skin to form a self-pierced opening therein in alignment with the retainer member opening which combines with the self-pierced opening to define an escape passage for deployment of the airbag into the passenger compartment of a vehicle.

Yet another object of the invention is to provide a cover assembly for concealing an airbag restraint system including an airbag, a housing for the airbag, a gas generator located in the housing for supplying gas to the air bag in response to vehicle impact; the cover assembly having an outer cover on the cover assembly fully concealing the air restraint system when the airbag is deflated; a cutter located inboard of the outer cover has a cutting edge in engagement with the outer cover and a carriage engageable with the airbag; the cutter is operative in response to deployment of the airbag to cut through the outer cover to form an opening therein for deployment of the airbag through the assembly to a point outwardly thereof for protecting a vehicle occupant in a vehicle passenger compartment.

Yet another object of the present invention is to provide a cover assembly of the preceding object wherein the cutter includes an impact surface thereon located in overlying relationship with the airbag and engageable therewith on deployment of the airbag to cut a three sided segment from the cover to form an opening therethrough for passage of the airbag from the housing during deployment thereof into a vehicle passenger compartment.

Still another object of the invention is to provide a cover assembly of the type set-forth herein wherein the cover assembly is characterized by the cutter means including a carriage formed as a plate supported in the cover and side cutters on a. least three sides of the plate; and each of the side cutters having an inboard segment thereon secured to the plate member and further having a free outboard segment engageable with the airbag as the airbag is inflated and moveable into cutting relationship with the cover to form an opening therethrough for passage of airbag from the housing during deployment of the airbag into a vehicle passenger compartment. Since the cutters are retracted in their normal position, they present no problem in low speed, head impacts when the airbag is not deployed.

These and other objects, advantages and features of the present invention will be more apparent when taken in conjunction with the following detailed description of the invention along with reference to the accompanying drawings wherein:

BRIEF DESCRIPTION OF THE DRAWINGS

FIG. 1 is a perspective view of an instrument panel assembly including the cover assembly of the present invention;

FIG. 2 is an enlarged, exploded view of a cutter unit in the embodiment of FIG. 1;

FIG. 3 is a fragmentary sectional view taken along the line 2—2 of FIG. 1 looking in the direction of the arrows and with an airbag in a deployed position;

FIG. 4 is a fragmentary sectional view of another embodiment of the present invention; and FIG. 5 is an enlarged exploded view of a cutter in the embodiment of FIG. 4.

DETAILED DESCRIPTION OF THE PREFERRED EMBODIMENT

FIG. 1 shows an instrument panel 10 having a airbag restraint system 12 located behind a cover assembly 14 constructed in accordance with the present invention.

The airbag restraint system 12 includes an airbag housing 16 which encloses a gas generator 18 for supplying an inflatant to an airbag 20 shown in a partially collapsed position within the housing 16. The airbag 20 includes an inboard end 22 defining a passage 22a for flow of the inflatant from the gas generator 18 into the interior 24 of the airbag 22 when a sensor 23 detects a vehicle impact of sufficient magnitude to send a fire signal to the gas generator 18. When the gas generator 18 is so energized, inflatant will fill the airbag 20. The airbag 20 also includes an outboard end 26 which is engageable with the inboard surface 28 of a cutter unit 30. Otherwise, the airbag 20 is made in accordance with the application to which it is adapted.

The cutter unit 30 includes a carriage or insert 32. The insert 32 is located in an opening 34 formed in a retainer member 36 which is secured by suitable fasteners in a known manner to the vehicle frame so as to fix the instrument panel 10 in place within the passenger compartment of the vehicle. The insert 32 has an outboard surface 32a bonded to a layer of urethane foam 37 formed in underlying relationship to a polymeric skin or shell 38 forming an uninterrupted cover over the instrument panel 10. The arrangement eliminates the need for placing a separate access door in the instrument panel with the attendant problems of alignment between the door and a hole formed through the instrument panel 10 for access to the airbag restraint system 12.

The insert 32 is shown in hidden line in FIG. 1 as having a rectangular shape. Three sides of the insert 32 carry cutter blades 40 having sharp edges 40a aligned with the edges of the opening 34. When the airbag 20 inflates the blades 40 are forced upwardly to cut a three sided opening in the outer surface 38 through which the airbag 20 is deployed into the passenger compartment. A separated segment 38a of the outer surface 38 and a separated segment 37a of the foam layer 37 remain connected to the instrument panel 10 at a hinge point 42 shown in FIG. 3.

While the cover assembly 14 is shown as having a urethane foam layer 37 with an outer shell 38 of various plastic polymers, it should be understood that the outer skin 38 can be formed as a more dense outer surface on the foam layer 37. Further, while an instrument panel 10 is illustrated with a retainer member 36, the invention is equally suitable for use with other interior trim products such as consoles and steering wheel covers. Further, the cover compositions and arrangements can have a different polymer composition than urethane foam. Further, the retainer member may be omitted and the cutter unit can be supported by other structure for piercing the cover assembly 14 solely in response to inflation of an airbag in an airbag restraint system.

Another embodiment of the present invention is shown in FIG. 4 as having a cutter unit 50 formed with a carriage 52 arranged in the same location as the cutter unit 30. Cutters 54 are provided on three sides of the carriage. Each of the cutters 54 have a flange 56 fixedly secured to the inboard surface 58 of the carriage 52. Each of the cutters 54 further includes a segment 60 which is bent downwardly and outwardly of the carriage 52 to form a cavity 62 into which an inflating airbag 64 will flow. The airbag 64 will fill the cavity 62 when it is inflated and it will act upwardly on the segments 60 to bend them into the same plane as the carriage 52 as shown on the right side of the centerline in FIG. 4. When the cutters 54 are bent upwardly a knife edge 66 thereon will be arranged to cut a three sided segment 68 from of a cover 70 corresponding to the cover configuration shown in the embodiment of FIG. 1.

As shown in FIG. 5, the carriage 52 fits in an opening 72 in a retainer member 74. The cutters 54 when fully bent extend through guide slots 76 in three sides of the carriage 52 and guide openings 78 in the retainer member 74 such that further inflation of the airbag 64 will drive the carriage 52 and knife edges 66 to push through the cover 70 in a self-piercing cutting action. The cutting action will create a three sided segment 68 hinged to an instrument panel at a hinge point 80. The separation of the three sided segment 68 occurs without tearing loose particles from the cover 70 so as to create an open path for deployment of the airbag 64 without production of any significant debris during the cutting action.

Examples of suitable foam materials include low modulus elastomers such as reaction injection molded urethane material having a flexural modulus in the range of 20-80,000 psi at 75 degrees F. or comparable urea or microcellular urethane foam material.

Examples of suitable shell materials include polyvinyl chloride or other thermoplastic materials such as thermoplastic elastomers or thermoplastic olefins or thermoset urethanes.

While exemplary materials for the cover assembly are disclosed herein it should be understood that the invention is applicable for use with a wide range of other materials including fabrics (both natural and synthetic) leather and other backing materials than the illustrated foam layers (which in certain cover assemblies can be omitted in the entirety).

The foregoing is a complete description of a preferred embodiment of the present invention. It should be understood, however, that various changes and modifications may be made without departing from the spirit and scope of the present invention as set-forth in the following claims.

What is claimed is:

1. A cover assembly for concealing an airbag restraint system including an airbag, a housing for the airbag, a gas generator located in the housing for supplying gas to the airbag in response to vehicle impact the cover assembly comprising:

an outer uninterrupted cover on said cover assembly fully concealing said air restraint system when said bag is deflated and extending over and beyond an opening formed in the cover during deployment of the airbag;

cutter means located inboard of said smooth outer cover including a cutter member and a carriage directly engageable with said airbag;

said cutter means operative in response to deployment of said airbag to cut through said outer uninterrupted cover to form the opening therein for deployment of said airbag through said cover assembly to a point outwardly thereof for protecting a vehicle occupant in a vehicle passenger compartment;

said cutter member having cutting teeth formed thereon in alignment with said outer uninterrupted cover; and said carriage having an impact surface thereon located in overlying relationship with said airbag and engageable therewith on deployment of said airbag to cut a three sided segment from said outer cover to form an opening therethrough for passage of said airbag from said housing during deployment thereof into a vehicle passenger compartment.

2. The cover assembly of claim 1, further characterized by said cover assembly including an instrument panel retainer member having a hole therein;

an insert member located in said hole and cutter members on said insert for cutting an opening in said outer cover;

said insert member being moveable from said retainer member opening as said airbag is inflated for causing said cutter members to pierce said outer cover to form an opening therethrough for passage of said airbag from said housing during deployment of said airbag into a vehicle passenger compartment.

3. The cover assembly of claim 1, further characterized by said outer cover having a layer of foam covered by an outer surface of material of greater density than the layer of foam.

4. A cover assembly for concealing an airbag restraint system including an airbag, a housing for the airbag, a gas generator located in the housing for supplying gas to the airbag in response to vehicle impact the cover assembly comprising:

an outer uninterrupted cover on said cover assembly fully concealing said air restraint system when said bag is deflated and extending over and beyond on opening formed in the cover during deployment of the airbag;

cutter means located inboard of said smooth outer cover including a cutter member and a carriage directly engageable with said airbag;

said cutter means operative in response to deployment of said airbag to cut through said outer uninterrupted cover to form the opening therein for deployment of said airbag through said cover assembly to a point outwardly thereof for protecting a vehicle occupant in a vehicle passenger compartment; and said cover assembly having a retainer member, said cutter means including a carriage formed as a plate supported in said retainer member and side cutters on at least three sides of said plate;

each of said side cutters having an inboard segment thereon secured to said plate and further having a free outboard segment engageable with said airbag as said airbag is inflated and movable into cutting relationship with said outer cover to form an opening therethrough for passage of said airbag from said housing during deployment of said airbag into a vehicle passenger compartment.

5. The cover assembly of claim 4, further characterized by said outer cover having a layer of foam covered by an outer surface of material of greater density than the layer of foam.

6. A cover assembly for concealing an airbag restraint system including an airbag, a housing for the airbag, a gas generator located in the housing for supplying gas to the airbag in response to vehicle impact the cover assembly comprising:

an outer uninterrupted cover on said cover assembly fully concealing said air restraint system when said bag is deflated;

cutter means located inboard of said smooth outer cover including a cutter member and a carriage directly engageable with said airbag;

said cutter means operative in response to deployment of said airbag to cut through said outer uninterrupted cover to form an opening therein for deployment of said airbag through said cover assembly to a point outwardly thereof for protecting a vehicle occupant in a vehicle passenger compartment;

said cutter member having cutting teeth formed thereon in alignment with said outer uninterrupted cover;

said carriage having an impact surface thereon located in overlying relationship with said airbag and engageable therewith on deployment with said airbag to cut a three sided segment from said outer cover by said cutter member to form an opening therethrough for passage said airbag from said housing during deployment thereof and to a vehicle passenger compartment.

7. A cover assembly for concealing an airbag restraint system including an airbag, a housing for the airbag, a gas generator located in the housing for supplying gas to the airbag in response to vehicle impact the cover assembly comprising:

an outer uninterrupted cover on said cover assembly fully concealing said air restraint system when said bag is deflated;

cutter means located inboard of said smooth outer cover including a cutter member and a carriage directly engageable with said airbag;

cutter means operative in response to deployment of said airbag to cut through said outer uninterrupted cover to form an opening therein for deployment of said airbag through said cover assembly to a point outwardly thereof for protecting a vehicle occupant in a vehicle passenger compartment, said cover assembly having a retainer member, said cutter means including the carriage formed as a plate supported in said retainer member and side cutters on at least three sides of said plate;

each of said side cutters having an inboard segment thereon secured to said plate and further having a free outboard segment engageable with said airbag as said airbag is inflated and moveable into cutting relationship with said outer cover to form an opening therewith through full passage of said airbag from said housing during deployment of said airbag into a vehicle passenger compartment.

* * * * *